(12) United States Patent
Kim

(10) Patent No.: US 10,991,011 B2
(45) Date of Patent: Apr. 27, 2021

(54) METHOD FOR MAKING A PROFIT USING INDIVIDUAL SHOPS, AND SYSTEM AND RECORDING MEDIUM

(76) Inventor: Jeung Ho Kim, Namyangju-si (KR)

( * ) Notice: Subject to any disclaimer, the term of this patent is extended or adjusted under 35 U.S.C. 154(b) by 1268 days.

(21) Appl. No.: 14/362,400

(22) PCT Filed: Jul. 3, 2012

(86) PCT No.: PCT/KR2012/005280
§ 371 (c)(1),
(2), (4) Date: Sep. 23, 2014

(87) PCT Pub. No.: WO2013/081267
PCT Pub. Date: Jun. 6, 2013

(65) Prior Publication Data
US 2015/0046262 A1   Feb. 12, 2015

(30) Foreign Application Priority Data
Dec. 2, 2011   (KR) .......................... 10-2011-0128583

(51) Int. Cl.
*G06Q 30/02* (2012.01)
(52) U.S. Cl.
CPC ......... *G06Q 30/0273* (2013.01); *G06Q 30/02* (2013.01); *G06Q 30/0259* (2013.01)
(58) Field of Classification Search
CPC .......................... G06Q 30/0273; G06Q 30/0259
USPC ........................................................ 705/14.57
See application file for complete search history.

(56) References Cited

U.S. PATENT DOCUMENTS

| | | | |
|---|---|---|---|
| 7,921,036 B1* | 4/2011 | Sharma | G06Q 20/3674 705/14.49 |
| 2011/0166925 A1* | 7/2011 | Khare | G06Q 30/02 705/14.43 |
| 2013/0110649 A1* | 5/2013 | Sugiura | G06Q 30/0224 705/14.73 |

* cited by examiner

*Primary Examiner* — Azam A Ansari
(74) *Attorney, Agent, or Firm* — Dinsmore & Shohl LLP; Yongsok Choi, Esq.

(57) ABSTRACT

The present invention relates to a method for making a profit using an individual shop. The method includes (a) when a first advertisement is provided from an advertisement provider terminal, an information providing server searching for display units that are suitable for displaying the first advertisement from among a plurality of display units installed in a plurality of individual shops on the basis of the properties of the first advertisement and medium analysis information for each of the plurality of display units installed in the plurality of individual shops; (b) when the advertisement provider terminal selects at least one display unit from among the searched display units, transmitting, by the information providing server, the first advertisement to the at least one selected display unit; (c) displaying the first advertisement on the at least one selected display unit; and (d) calculating, by the information providing server, an advertisement fee for the first advertisement, and calculating a portion of the advertisement fee as a profit of an individual providing the individual shop in which the at least one selected display unit is installed.

12 Claims, 5 Drawing Sheets

130

METHOD FOR MAKING A PROFIT USING INDIVIDUAL SHOPS, AND SYSTEM AND RECORDING MEDIUM

FIELD OF THE INVENTION

The present invention relates to a method and system for making a profit on a private shop, wherein when a display unit is installed in the private shop and an advertisement (e.g., video, image, contents or the like) is provided from an advertisement provider to an information providing server, the information providing server automatically displays the advertisement on the display unit of the private shop, which the advertisement provider has designated or the information providing server has analyzed and selected, and a company of the information providing server receives an advertisement fee from the advertisement provider and distributes the advertisement fee to a person of the private shop.

BACKGROUND

In general, a display unit in a private shop is used as a receiver for providing television or cable broadcasts, or used to display information on the shop with video, image, contents or the like.

Therefore, there has been no way to make an additional profit on a private shop because the display unit of the private shop is simply used to provide broadcasts or display information on the private shop.

In this regard, a method for making a profit by displaying an advertisement using a display unit of a private shop has been contrived. However, the method has a disadvantage of requiring considerable time and cost because an advertisement provider should visit and make a request in each private shop that demands to display the advertisement.

Further, it may be difficult to easily display the advertisement when a display unit is not provided in the private shop demanding to display the advertisement or when there is no one having expertise to display the advertisement even if a display unit is provided.

According to the technique disclosed in Korean Laid-open Patent Publication No. 2000-0054805, when a server is provided with an advertisement, it may transmit the advertisement to a display unit so that the advertisement may be displayed. However, the technique has disadvantages in that it fails to designate a display unit that demands to display the advertisement or bring a profit to a private shop that provides a space in which the display unit is installed.

SUMMARY OF THE INVENTION

One object of the present invention is to solve the above-described problems.

Another object of the invention is to make a profit on a private shop, wherein when a display unit is installed in the private shop and an advertisement is provided from an advertisement provider to an information providing server, the information providing server displays the advertisement on the display unit of the private shop which the advertisement provider has designated, or on the display unit suitable for displaying the advertisement or contents, which is selected on the basis of information on the properties of the private shop analyzed by the information providing server, and a company of the information providing server receives an advertisement fee from the advertisement provider and distributes the advertisement fee to a person of the private shop.

According to one aspect of the invention to achieve the objects as described above, there is provided a method for making a profit on a private shop, comprising the steps of: (a) when a first advertisement is provided from an advertisement provider terminal, searching, by means of an information providing server, for display units suitable for displaying the first advertisement from among a plurality of display units installed in a plurality of private shops, on the basis of the properties of the first advertisement and media analysis information for each of the plurality of display units; (b) when the advertisement provider terminal selects at least one display unit from among the searched display units, transmitting the first advertisement to the at least one selected display unit by means of the information providing server; (c) displaying the first advertisement by means of the at least one selected display unit; and (d) by means of the information providing server, calculating an advertisement fee for the first advertisement and calculating a portion of the advertisement fee as a profit of a person who has provided the private shop in which the at least one selected display unit is installed.

According to another aspect of the invention, there is provided a system for making a profit on a private shop, comprising: a plurality of display units installed in a plurality of private shops; and an information providing server, wherein when a first advertisement is provided from an advertisement provider terminal, the information providing server searches for display units suitable for displaying the first advertisement from among the plurality of display units, on the basis of the properties of the first advertisement and media analysis information for each of the plurality of display units; when the advertisement provider terminal selects at least one display unit from among the searched display units, the information providing server transmits the first advertisement to the at least one selected display unit; and the information providing server calculates an advertisement fee for the first advertisement and calculates a portion of the advertisement fee as a profit of a person who has provided the private shop in which the at least one selected display unit is installed, and wherein the at least one selected display unit displays the first advertisement.

In addition, there are further provided other methods, systems and computer-readable recording media having stored thereon computer programs for executing the methods to implement the invention.

According to the invention, an advertisement provider (advertiser) may save time, effort and cost because the advertisement provider is not required to visit and make a request in each private shop that demands to display an advertisement.

According to the invention, a person of a private shop may make an additional profit by providing an unused empty space to install a display unit for displaying an advertisement.

DETAILED DESCRIPTION OF THE PREFERRED EMBODIMENTS

Figure 1:
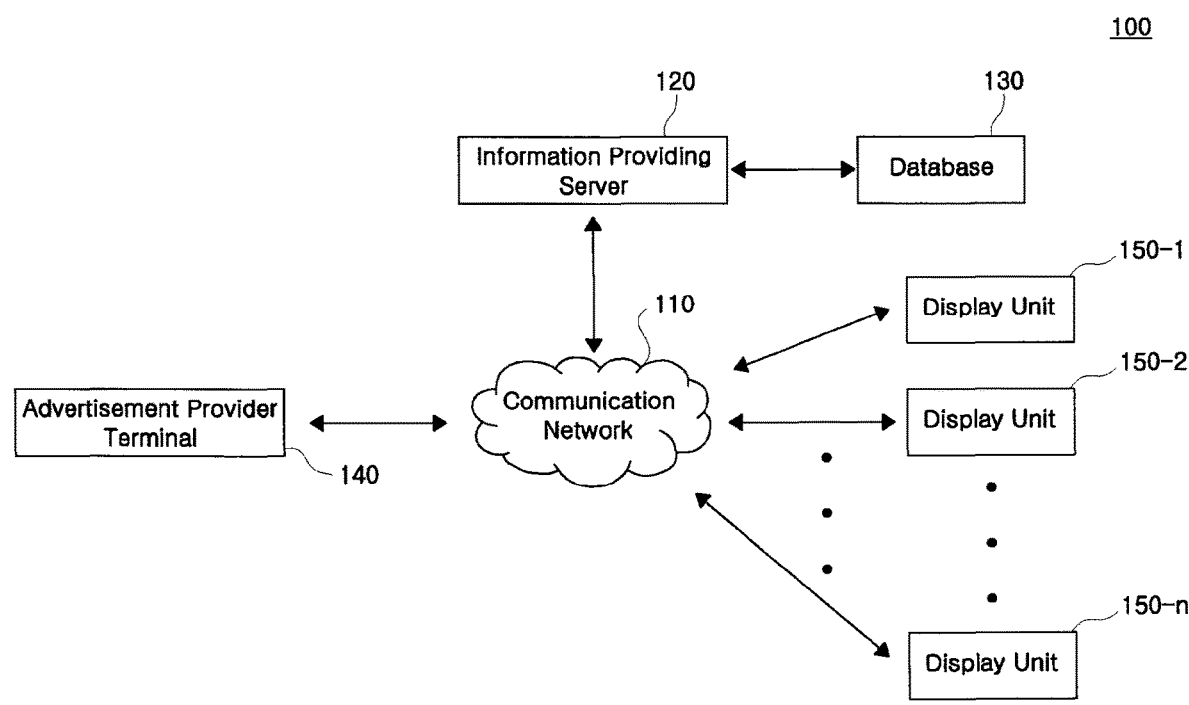
FIG. 1 is a block diagram showing the configuration of a system for making a profit on a private shop according to the invention.

In the following detailed description of the present invention, references are made to the accompanying drawings that show, by way of illustration, specific embodiments in which the invention may be practiced. These embodiments are described in sufficient detail to enable those skilled in the art to carry out the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Further, it shall be understood that the locations or arrangements of individual elements within each of the embodiments described herein may also be modified without departing from the spirit and scope of the invention. Accordingly, the following detailed description is not to be taken in a limiting sense, and the scope of the invention is to be taken as encompassing the scope of the appended claims and all equivalents thereof, as long as properly described. In the drawings, like reference numerals refer to the same or similar functions throughout the several views Hereinafter, preferred embodiments of the present invention will be described in detail with reference to the accompanying drawings to enable those skilled in the art to easily implement the invention.

FIG. 1 is a block diagram showing the configuration of a system for making a profit on a private shop according to the invention. The system for making a profit 100 comprises a communication network 110; an information providing server 120, a database 130, an advertisement provider terminal 140; and n display units 150-1 to 150-n. The n display units 150-1 to 150-n may be installed in n private shops located in different areas.

Although FIG. 1 shows one advertisement provider terminal 140, there may be provided a plurality of advertisement provider terminals 140, like the n display units 150-1 to 150-n. Further, although it is shown that there exists one database 130, it may be provided as divided into plural or provided within the information providing server 120.

Further, the term, "private shop" herein encompasses all empty spaces exposed to the public other than private shops, which may include empty spaces inside or outside buses, trains and subway trains.

The function of each of the blocks shown in FIG. 1 will be described below.

The communication network 110 may be implemented regardless of communication modality such as wired and wireless communications, and may be constructed from a variety of communication networks such as local area networks (LANs), metropolitan area networks (MANs), and wide area networks (WANs). Preferably, the communication network 110 described herein may be a known world wide web (WWW). Further, the information providing server 120 and the n display units 150-1 to 150-n may be implemented to be connected with a separate dedicated communication network. Simply, the communication network 110 may be the Internet.

Media analysis information collected from the n private shops, advertisements provided from the advertisement provider terminal 140, and details of advertisement fees may be organized and stored into the database 130 by the information providing server 120. In addition, customer information provided by the advertisement provider terminal 140 and information on members who have provided the n private shops may be organized and stored into the database 130 by the information providing server 120. In order to collect the media analysis information for the n private shops, the persons who own the n private shops may connect to the information providing server 120 and conduct a self-evaluation on each of media evaluation items provided by the information providing server, or an evaluator from a company of the information providing server may visit the private shops in person and make an evaluation on each of the media evaluation items. In the present invention, advertisements may include videos, images, contents, and user interface windows. The types of contents may encompass culture, art, entertainment (movies, music videos, animations, shows, etc.) and the like, and the contents may be represented in videos, images and sounds. The information providing server 120 may store or pre-store information query programs, reservation programs, purchasing programs, game programs and the like provided from the advertisement provider terminal 140 in order to provide user interface windows, and may provide the user interface windows as advertisements by executing those programs.

Further, the information providing server 120 may transmit advertisements to the display units designated by the advertisement provider terminal 140, or to the display units suitable for the advertisements provided from the advertisement provider terminal 140 on the basis of the media analysis information collected from the n private shops.

In addition, the information providing server 120 may transmit details of advertisement fees to the advertisement provider terminal 140 if they are charged at a flat rate. If the advertisement fees are charged at a measured rate, the information providing server 120 may calculate them on the basis of the media analysis information collected from the n private shops and the display dates and times or the like, and transmit the details thereof to the advertisement provider terminal 140.

Further, if e-mail addresses or mobile phone numbers of the persons who have provided the private shops are stored in the database 130, the information providing server 120 may also calculate a portion of the advertisement fees as profits of the persons who have provided the private shops, and send the details thereof via e-mail to the e-mail addresses of the persons of the private shops or via text message to their mobile phones.

The database 130 may store the information on customers and members, media analysis information, advertisements and contents, and details of advertisement fee calculation provided from the information providing server 120.

The advertisement provider terminal 140 may provide customer information for customer registration, provide advertisements desired to be displayed, and designate display units desired to display the advertisements. In addition, the advertisement provider terminal 140 may provide information on dates and times desired to display the advertisements or the like, choose whether advertisement fees are paid at a flat rate or a measured rate, and provide information on the advertisement provider (advertiser).

Each of the n display units 150-1 to 150-n may display advertisements transmitted from the information providing server 120. Further, each of the n display units 150-1 to 150-n may receive an instruction from the information providing server 120 and, in response to the instruction of the information providing server 120, may connect to the information providing server 120 to receive and display an advertisement. The n display units 150-1 to 150-n may be configured such that they are not capable of transmitting data but only capable of receiving data.

Figure 2:
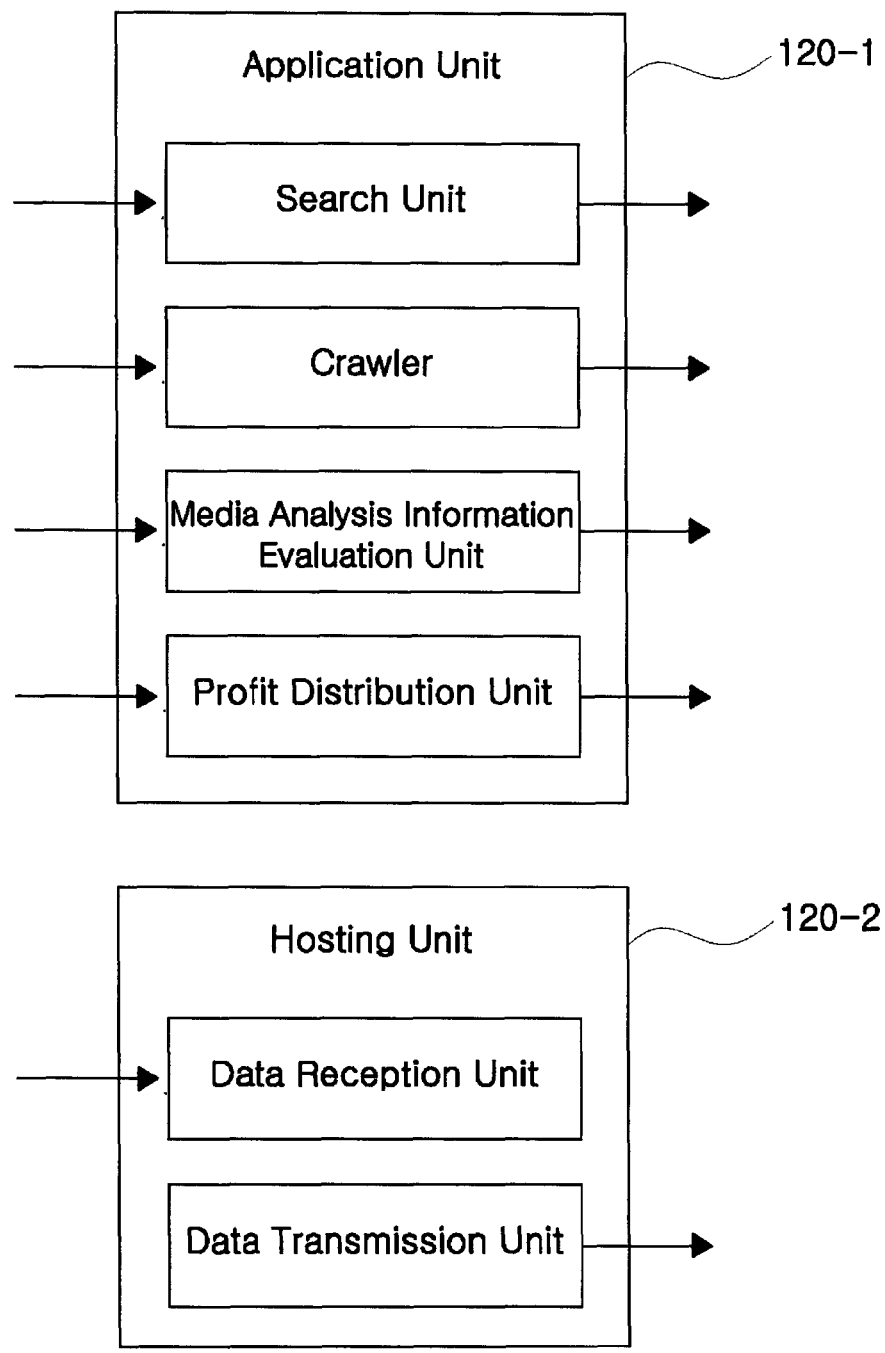
FIG. 2 is a block diagram showing the configuration of an information providing server according to one embodiment of the invention.

FIG. 2 is a block diagram showing the configuration of the information providing server according to one embodiment of the invention. The information providing server 120 may comprise an application unit 120-1 and a hosting unit 120-2. The application unit 120-1 may comprise a search unit, a crawler, a media analysis information evaluation unit and a profit distribution unit. The hosting unit 120-2 may comprise a data reception unit and a data transmission unit.

The function of each of the blocks shown in FIG. 2 will be described below.

When an advertisement is provided from the advertisement provider terminal 140, the search unit of the application unit 120-1 may search the media analysis information stored in the database 130 for display units in locations suitable for displaying the advertisement, on the basis of the properties of the advertisement, and may present the searched display units to the advertisement provider terminal 140. Further, when the advertisement provider at the advertisement provider terminal 140 selects at least one display unit from among the searched display units, the information providing server 110 may store in the database 130 the advertisement together with the advertisement provider, the display date and time, and the selected display unit.

The crawler of the application unit 120-1 may establish associative relations between the display units having media analysis evaluation scores, which are obtained by analyzing and evaluating the media analysis information for the display units installed in the n private shops (e.g., information on the locations, installation spaces, target audience, and types of advertising materials), and the properties of the advertisement and/or the advertisement fee, and may store them in the database 130. For example, the associative relations may be established such that the display units in the private shops dealing with the properties different from those of the advertisement are evaluated to be in close relation, and the display units having high media analysis evaluation scores are evaluated to be in close relation to advertisements of customers with high advertisement fees.

Among the media analysis information, information on the locations may be the scale of areas of the locations, characteristics of the areas, scope of influence of stations, iconic status in the areas, specific positions and the like; information on the installation spaces may be the types of business of the locations, characteristics of the locations, ranks, sales scales, services and the like; information on the target audience may be the class of the target audience, speed of floating population; degree of congestion of floating population, speed of floating vehicles, degree of congestion of floating vehicles, and the like; and information on the types of advertising materials may be the exposing directions, number of exposed pages, method of advertising, degree of interference of advertising, density of neighboring advertising materials, and the like.

The media analysis information evaluation unit of the application unit 120-1 may give a media analysis evaluation score to each of the display units 150-1 to 150-n on the basis of the media analysis information for each of the n private shops, and may store the scores in the database 130.

The profit distribution unit of the application unit 120-1 may calculate the advertisement fees to be charged to the advertisement provider and calculate a portion of the advertisement fees as profits of the persons who have provided the private shops, and may store them in the database 130. The profit distribution unit may transmit the details of the advertisement fees to the advertisement provider terminal 140 if they are charged at a flat rate. If the advertisement fees are charged at a measured rate, the profit distribution unit may calculate them on the basis of the media analysis information collected from the n private shops and the display dates and times or the like, and transmit the details thereof to the advertisement provider terminal 140. The profit distribution unit may calculate the advertisement fees with different weight values according to the display dates (e.g. whether they are ordinary days or in a peak season, or whether they are holidays or in a special event period, Christmas season, year-end season, weekends, or consecutive holidays, among the peak season) and the display time periods (e.g., whether they are ordinary time periods or in prime time, or whether they are between 7 a.m. and 9 a.m., 9 p.m. and 10 p.m., 12 p.m. and 2 p.m., 5 p.m. and 7 p.m., or 7 p.m. and 9 p.m., among the prime time).

However, if a person who has provided a private shop does not want to receive a portion of the advertisement fee as a profit of the person but wants to receive a fixed amount of money every month (i.e., desires to be paid at a flat rate), to receive other articles (e.g., goods such as a television set or refrigerator), or to display some information that the person desires to display (e.g., an advertisement on the shop of the person), for example, then the information thereon may be stored in the profit distribution unit. To this end, each of the persons who have provided the private shops may connect to the information providing server 120 using a personal terminal and choose one of the above three options, if the person does not want to receive a portion of the advertisement fee as a profit of the person.

The data reception unit of the hosting unit 120-2 may receive advertisement provider information, which is inputted in the advertisement provider terminal 140. In addition, the data reception unit may also receive media analysis information, which is inputted by a person who has provided a private shop using a personal terminal.

The data transmission unit of the hosting unit 120-2 may provide an advertisement to a designated display unit on the date and time designated by the advertisement provider. Here, when there are at least two display units to be provided with the advertisement, the data transmission unit of the hosting unit 120-2 may provide the advertisement to the at least two display units at the same time. Also, the data transmission unit of the hosting unit 120-2 may provide information on the advertisement to be displayed on the designated date and time to the designated display unit, and may transmit the advertisement when a request for transmission of the advertisement is made from the designated display unit on the designated date and time.

Figure 3:
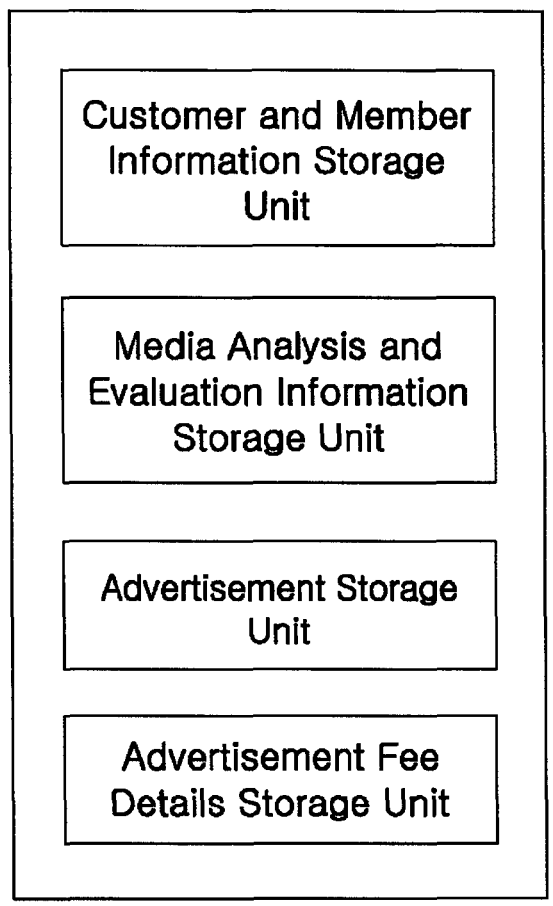
FIG. 3 shows the structure of a database according to one embodiment of the invention.

FIG. 3 shows the structure of the database according to one embodiment of the invention. The database 130 may comprise a customer information storage unit, a media analysis and evaluation information storage unit, an advertisement storage unit, and an advertisement fee details storage unit.

The function of each of the blocks shown in FIG. 3 will be described below.

The customer information storage unit may store information on an advertisement provider, i.e., advertiser information, which is provided by the advertisement provider terminal 140. In addition, it may store information on a person who has provided a private shop, i.e., member information. The person who has provided the private shop may connect to the information providing server using a personal terminal and provide the member information. The advertiser information and member information may include e-mail addresses and/or mobile phone numbers.

The media analysis information storage unit may store media analysis information for the n display units 150-1 to 150-n. The media analysis information may be collected by a person who has provided a private shop connecting to the information providing server 120 and filling in media evaluation items provided by the information providing server, and may also be collected by a company of the information providing server visiting the private shop and making an evaluation on the media evaluation items. Further, the media analysis information may be updated by the person who has provided the private shop connecting to the information providing server 120 and updating the media analysis information when the media analysis information is changed, and may also be updated by the company of the information providing server visiting the private shop regularly or irregularly and making a re-evaluation on the media evaluation items.

Further, the media analysis and evaluation information storage unit may include information on associative relations between the types of advertisements and contents and the advertisement fees, which are analyzed by the crawler of the application unit 120-1 of the information providing server 120, and the display units having the appropriate media analysis information. In addition, the media analysis and evaluation information storage unit may include media analysis evaluation information for the n display units 150-1 to 150-n of the n private shops evaluated by the media analysis information evaluation unit of the application unit 120-1.

The advertisement storage unit may store advertisements provided by the advertisement provider terminal 140. The advertisement storage unit may include information on the display dates and times of the advertisements, and information on the display units to display the advertisements.

The advertisement fee details storage unit may store advertisement fee details such as the advertisement fees to be charged to the advertisement provider and the profits to be paid to the persons of the private shops, which are calculated by the profit distribution unit of the application unit 120-1 of the information providing server 120.

Figure 4:
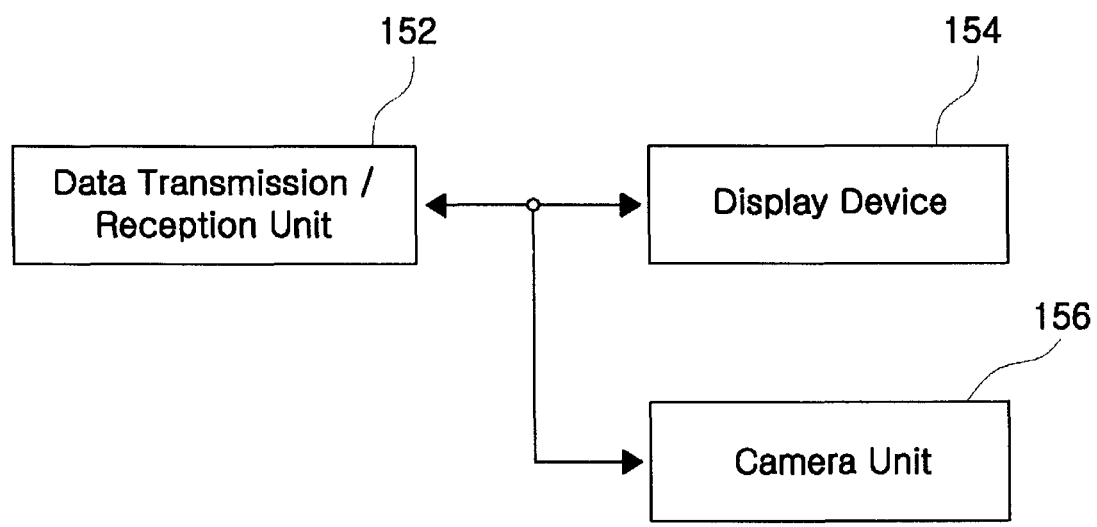
FIG. 4 is a block diagram showing the configuration of a display unit according to one embodiment of the invention.

FIG. 4 is a block diagram showing the configuration of the display unit according to one embodiment of the invention. The display unit 150-1 may comprise a data transmission/reception unit 152, a display device 154, and a camera unit 156. In FIG. 4, the camera unit 156 is not necessarily required, but may optionally be provided. Further, although the data transmission/reception unit 152 and the display device 154 are shown to be provided separately, the data transmission/reception unit 152 may be provided within the display device 154.

The function of each of the blocks shown in FIG. 4 will be described below.

The data transmission/reception unit 152 may receive advertisements transmitted from the information providing server 120. Further, the data transmission/reception unit 152 may receive instructions transmitted from the information providing server 120, e.g., information on the advertisements to be displayed and the display dates and times, and may connect to the information providing server 120 to receive the advertisements.

The display device 154 may display advertisements transmitted from the data transmission/reception unit 152. The display device 154 may be implemented not only with a display device dedicated for display such as an LCD, LED, OLED and PDP, but also with a display device with additional capabilities for touch, motion recognition and/or temperature. The display device 154 may have a built-in loudspeaker so that it may not only simply display videos, images or contents but also output associated voices or sounds. Further, the display device 154 may be a device capable of various forms of display, such as a three-dimensional (3D) display device or a 3D holographic display device.

When a display device with touch capabilities is employed, a viewer of the advertisement displayed on the display unit 154 may touch a screen so that the displayed advertisement may react thereto. Further, when a display device with motion recognition capabilities is employed, a motion of a viewer of the advertisement displayed on the display unit 154 may be recognized so that the displayed advertisement may react thereto. That is, it may be interactively operated, and a viewer of the displayed advertisement may touch the screen or perform a motion to make a reservation or submit an entry for an event, for example. That is, any type of display devices may be employed for the display unit 154.

The camera unit 156 may be used to collect and update media analysis information for the private shops. Further, the camera unit 156 may be used to identify the number of viewers who watch an advertisement when it is displayed. Further, the images taken by the camera unit 156 may be provided to the information providing server 120 via the data transmission/reception unit 152, and the information providing server 120 may count the number of viewers who watch the corresponding advertisement from the images, and reflect information on the counted number of viewers in the calculation of the profits of the persons who have provided the private shops. That is, when the counted number of viewers is high, additional profits may be provided to the persons who have provided the corresponding private shops.

Further, in order to prevent information available for personal identification from being collected from the images taken by the camera unit 156 for privacy protection, the data transmission/reception unit 152 may detect faces from the images to take a headcount and then transmit only information on the headcount to the information providing server 120, and may discard the images or perform a mosaic processing on the images to store them or transmit them to the information providing server 120. In addition, the data transmission/reception unit 152 may transmit the mosaic-processed images to the information providing server 120, and the information providing server 120 may detect faces from the mosaic-processed images to take a headcount and then store or discard the mosaic-processed images.

Further, if a user of a mobile terminal connects to the information providing server 120 via the communication network 110 in FIG. 1 to sign up for a membership, pay an advertisement fee, and designate a display unit, then an advertisement based on random advertising and character, number and symbol input may be displayed on an additional pop-up window in the designated data transmission/reception and display unit. That is, while advertisements or contents are displayed on a full screen of the display unit, an advertisement based on random advertising and character, number and symbol input may be displayed via an additional pop-up window (overlay window) in a small screen.

Further, if the advertisement displayed on the display unit is related to an entry for an event, a user of a mobile terminal may watch the advertisement displayed on the corresponding display unit and submit an entry for the event so that an identifier of the corresponding data display unit may be inputted. In this case, when the information providing server 120 calculates an advertisement fee, an additional profit may be paid to a person who has provided a private shop in which a display unit with a large number of event participants is installed.

Figure 5:
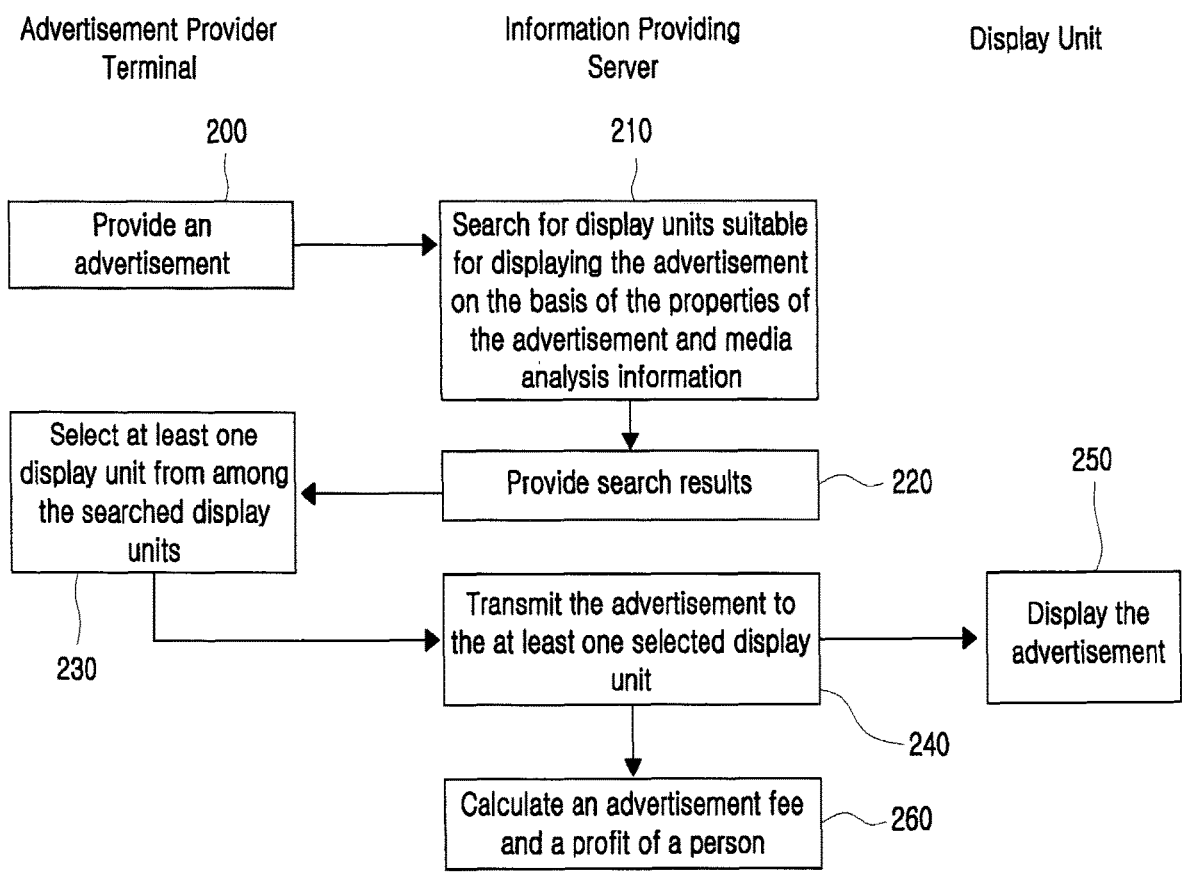
FIG. 5 is an operation flowchart of a method for making a profit on a private shop according to one embodiment of the invention.

FIG. 5 is an operation flowchart of a method for making a profit on a private shop according to one embodiment of the invention.

First, the advertisement provider terminal 140 connects to the information providing server 120 and provides an advertisement to the information providing server 120 (step 200).

In addition, the advertisement provider terminal 140 may further provide a display date and time period to the information providing server 120. The information providing server 120 may store the advertisement and the display date and time period in the database 130. Further, the advertisement provider terminal 140 may designate whether an advertisement fee for the advertisement is paid at a flat rate or a measured rate.

The information providing server 120 searches for display units suitable for displaying the advertisement from among the n display units 150-1 to 150-*n* installed in the n private shops, on the basis of the properties of the advertisement and media analysis information for each of the n display units (step 210).

The information providing server 120 may search for the display units suitable for displaying the advertisement from among the n display units 150-1 to 150-*n* installed in the n private shops, on the basis of the associative relations, which are stored in the database 130, between the properties of the advertisement and/or the advertisement fee and the media analysis evaluation scores of each of the n display units.

The information providing server 120 transmits search results to the advertisement provider terminal 140 (step 220).

The advertisement provider terminal 140 selects at least one display unit from among the searched display units (step 230).

The information providing server 120 transmits the advertisement to the at least one selected display unit (step 240).

The information providing server 120 may transmit the advertisement stored in the database 130 to the at least one selected display unit on the designated display date and time period.

The at least one selected display unit displays the advertisement (step 250).

The information providing server 120 calculates the advertisement fee for the advertisement, and calculates a portion of the advertisement fee as a profit of a person who has provided the at least one selected display unit (step 260).

The information providing server 120 may store the calculated advertisement fee and profit of the person in the database 130. If the advertisement provider terminal 140 has designated in step 200 that the advertisement fee is paid at a measured rate, then the information providing server 120 may calculate the advertisement fee on the further basis of the media analysis information and the display date and time period.

The embodiments according to the present invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described in terms of specific items such as detailed components as well as the limited embodiments and the drawings, they are only provided to help general understanding of the invention, and the present invention is not limited to the above embodiments. It will be appreciated by those skilled in the art that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A non-transitory computer-readable recording medium having stored thereon a computer program for executing a method for displaying an advertisement, comprising the steps of:
    (a) on the basis of media analysis information for each of a plurality of display units installed in a plurality of private shops located in a plurality of places and properties of an advertisement provided from an advertisement provider terminal, searching, by means of an information providing server, for display units suitable for displaying the advertisement from among the plurality of display units;
    (b) when the advertisement provider terminal selects at least one display unit from among the searched display units, transmitting the advertisement to the at least one selected display unit by means of the information providing server;
    (c) displaying the advertisement by means of the at least one selected display unit;
    (d) by means of the information providing server, calculating an advertisement fee for the advertisement and determining at least a portion of the calculated advertisement fee as a profit of an entity who has provided the at least one selected display unit; and
    (e) transmitting the information on the portion of the calculated advertisement fee to a device of the entity in response to determining the portion of the calculated advertisement fee as the profit of the entity,
    wherein in step (a), the information providing server searches for display units suitable for displaying the advertisement on the basis of an associative relation between at least one of the properties of the advertisement and the advertisement fee, and a media analysis evaluation score of each of the plurality of display units, wherein a display unit installed in a private shop dealing with properties different from the properties of an advertisement is given a greater associative relation value with respect to the advertisement than another display unit installed in another private shop dealing with properties matching with the properties of the advertisement, wherein the media analysis evaluation score is derived on the basis of the media analysis information for each of the plurality of display units and given to each of the plurality of display units, and wherein the media analysis information includes at least one of information on a location of each of the plurality of display units, information on an installation space of each of the plurality of display units, information on a target audience of each of the plurality of display units, and information on types of advertising materials of each of the plurality of display units.

2. A non-transitory computer-readable recording medium as claimed in claim 1, wherein in step (a), information on a display date and time period for the advertisement is further provided from the advertisement provider terminal to the information providing server, and wherein in step (b), the information providing server transmits the advertisement to the at least one selected display unit on the display date and time period.

3. A non-transitory computer-readable recording medium as claimed in claim 2, wherein in step (a), the advertisement provider terminal designates a payment type of the advertisement fee as one of flat rate payment and measured rate payment, and wherein in step (d), if the payment type of the advertisement fee is designated as measured rate payment, the information providing server calculates the advertisement fee on the basis of the media analysis information and the display date and time period.

4. A non-transitory computer-readable recording medium as claimed in claim 1, wherein in step (a), the media analysis information is provided from the plurality of places to the information providing server.

5. A non-transitory computer-readable recording medium as claimed in claim 1, wherein images taken by an imaging devices installed in each of the plurality of places are transmitted to the information providing server, and the information providing server obtains and updates the media analysis information on the basis of the taken images.

6. A non-transitory computer-readable recording medium as claimed in claim 5, wherein in step (d), the information providing server obtains a headcount of viewers of the advertisement on the basis of the taken images, and determines an additional profit of the entity who has provided the at least one selected display unit on the basis of the headcount.

7. A non-transitory computer-readable recording medium as claimed in claim 1, wherein if the advertisement comprises an entry for an event and the entry for the event is submitted together with an identifier of the display unit in which the advertisement is displayed, then in step (d), the information providing server determines an additional profit of the entity who has provided the display unit corresponding to the identifier on the basis of the number of times the identifier is submitted.

8. A system for displaying an advertisement, comprising:
an information providing server;
an advertisement provider terminal for providing an advertisement to the information providing server; and a plurality of display units installed in a plurality of private shops located in a plurality of places, wherein the information providing server:

searches for display units suitable for displaying the advertisement from among the plurality of display units, on the basis of media analysis information for each of the plurality of display units and properties of the advertisement;

when the advertisement provider terminal selects at least one display unit from among the searched display units, transmits the advertisement to the at least one selected display unit and causes the at least one selected display unit to display the advertisement;

calculates an advertisement fee for the advertisement and determines at least a portion of the calculated advertisement fee as a profit of an entity who has provided the at least one selected display unit; and transmits the information on the portion of the calculated advertisement fee to a device of the entity in response to determining the portion of the calculated advertisement fee as the profit of the entity, wherein the information providing server searches for display units suitable for displaying the advertisement on the basis of an associative relation between at least one of the properties of the advertisement and the advertisement fee, and a media analysis evaluation score of each of the plurality of display units, wherein a display unit installed in a private shop dealing with properties different from the properties of an advertisement is given a greater associative relation value with respect to the advertisement than another display unit installed in another private shop dealing with properties matching with the properties of the advertisement wherein the media analysis evaluation score is derived on the basis of the media analysis information for each of the plurality of display units and given to each of the plurality of display units, and wherein the media analysis information includes at least one of information on a location of each of the plurality of display units, information on an installation space of each of the plurality of display units, information on a target audience of each of the plurality of display units, and information on types of advertising materials of each of the plurality of display units.

9. A system as claimed in claim 8, wherein the advertisement provider terminal further provides information on a display date and time period for the advertisement to the information providing server, and wherein the information providing server transmits the advertisement to the at least one selected display unit on the display date and time period.

10. A system as claimed in claim 9, wherein the advertisement provider terminal designates a payment type of the advertisement fee as one of flat rate payment and measured rate payment, and wherein if the payment type of the advertisement fee is designated as measured rate payment, the information providing server calculates the advertisement fee on the basis of the media analysis information and the display date and time period.

11. A system as claimed in claim 8, wherein images taken by an imaging device installed in each of the plurality of places are transmitted to the information providing server, and the information providing server obtains and updates the media analysis information on the basis of the taken images.

12. A system as claimed in claim 8, wherein if the advertisement comprises an entry for an event and the entry for the event is submitted together with an identifier of the display unit in which the advertisement is displayed, then the information providing server determines an additional profit of the entity who has provided the display unit corresponding to the identifier on the basis of the number of times the identifier is submitted.

* * * * *